United States Patent
Ghannam et al.

(10) Patent No.: US 10,914,112 B2
(45) Date of Patent: Feb. 9, 2021

(54) VEHICLE LIFTGATE CONTROL FOR CARGO MANAGEMENT

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 15/957,548

(22) Filed: Apr. 19, 2018

(65) Prior Publication Data

US 2019/0323281 A1 Oct. 24, 2019

(51) Int. Cl.
*E05F 15/73* (2015.01)
*B60Q 9/00* (2006.01)
*B60J 5/10* (2006.01)
*B60J 5/00* (2006.01)

(52) U.S. Cl.
CPC ............... *E05F 15/73* (2015.01); *B60J 5/101* (2013.01); *B60Q 9/00* (2013.01); *B60J 5/00* (2013.01); *B60J 5/102* (2013.01); *B60J 5/103* (2013.01); *B60J 5/104* (2013.01); *B60J 5/105* (2013.01); *B60J 5/106* (2013.01); *E05Y 2400/356* (2013.01); *E05Y 2400/44* (2013.01); *E05Y 2400/85* (2013.01); *E05Y 2900/546* (2013.01)

(58) Field of Classification Search
CPC .. E05F 15/73; B60J 5/101; B60J 5/102; B60J 5/103; B60J 5/104; B60J 5/105; B60J 5/106; B60J 5/00
See application file for complete search history.

(56) References Cited

U.S. PATENT DOCUMENTS

| | | | | |
|---|---|---|---|---|
| 5,852,672 A * | 12/1998 | Lu | ....................... | G01B 11/2441 382/154 |
| 5,864,101 A * | 1/1999 | Nishizawa | ............ | B60P 1/4471 187/222 |
| 6,901,704 B2 * | 6/2005 | Sakaue | .................... | E05F 15/63 296/56 |
| 6,958,451 B2 * | 10/2005 | Breed | .................... | B60N 2/002 177/1 |
| 7,423,400 B2 * | 9/2008 | Chinsen | ................ | E05F 15/611 318/280 |
| 7,547,058 B2 * | 6/2009 | King | ........................ | B60J 5/101 296/146.8 |

(Continued)

FOREIGN PATENT DOCUMENTS

DE 102014005079 A1 10/2015
KR 20030016093 A 2/2003

*Primary Examiner* — Thomas Ingram
*Assistant Examiner* — Omar K Morsy
(74) *Attorney, Agent, or Firm* — Frank Lollo; Eversheds Sutherland (US) LLP (57) ABSTRACT

Method and apparatus are disclosed for vehicle liftgate control for cargo management. An example vehicle includes a liftgate with a sensor on an inner surface and a processor. The liftgate provides access to a cargo area. The processor, when an object is in the cargo area, detect when the object is banked against the liftgate using measurements from the sensor, and when the object is banked and a command to open the liftgate is received, autonomously opens the liftgate to an intermediate position between fully open and fully closed.

20 Claims, 4 Drawing Sheets

(56) References Cited

U.S. PATENT DOCUMENTS

| | | | |
|---|---|---|---|
| 8,965,629 B2* | 2/2015 | Debouk | B60R 16/02 |
| | | | 701/2 |
| 9,199,608 B2 | 12/2015 | Newman et al. | |
| 9,533,575 B2* | 1/2017 | Tran | B60G 17/0165 |
| 9,630,718 B2 | 4/2017 | Scown et al. | |
| 9,745,064 B2 | 8/2017 | Balasubramanian | |
| 9,797,179 B2* | 10/2017 | Washeleski | E05F 15/40 |
| 2014/0195073 A1* | 7/2014 | Herthan | B60R 25/2045 |
| | | | 701/2 |
| 2015/0096233 A1* | 4/2015 | Kojima | H02P 3/14 |
| | | | 49/31 |

* cited by examiner

VEHICLE LIFTGATE CONTROL FOR CARGO MANAGEMENT

TECHNICAL FIELD

The present disclosure generally relates to liftgates of a vehicle and, more specifically, vehicle liftgate control for cargo management.

BACKGROUND

Vehicles include liftgates that can automatically open and close based on an input from a user. For example, the input may be from a mobile device (e.g., a smart phone, a smart watch, etc.), a key fob, a button configured to be tapped by the user's foot, or a hardware or software button on a center console. These liftgates provide external access to a cargo area of the vehicle. Because the liftgate can be opened remotely (e.g., without the user being physically next to the liftgate), the liftgate can be opened without the user seeing the state of cargo within the cargo area of the vehicle. While the vehicle is traveling, bumps and curves in the road and/or acceleration and deceleration, cargo in the cargo area can sift.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle liftgate control for cargo management. An example vehicle includes a liftgate with a sensor on an inner surface and a processor. The liftgate provides access to a cargo area. The processor, when an object is in the cargo area, detect when the object is banked against the liftgate using measurements from the sensor, and when the object is banked and a command to open the liftgate is received, autonomously opens the liftgate to an intermediate position between fully open and fully closed.

An example method includes determining, with a liftgate sensor, whether an object is in a cargo area of a vehicle. The example method also includes determining, with a vehicle processor, whether the object is likely to fall out of the vehicle from the cargo area. Additionally, the example method includes, when the object is likely to fall out of the vehicle and a command to open the liftgate is received, autonomously opening the liftgate to an intermediate position between fully open and fully closed.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include liftgates that can automatically open and close based on an input from a user. In some examples, to facilitate opening and closing the liftgate while the user is not standing next to the liftgate, the vehicles responds to input from the user to automatically open or close the liftgate. For example, the vehicle may accept input from a mobile device, a key fob, and/or a button on the center console, etc. In some examples, to facilitate opening and closing the liftgate while the user's hands are full, the vehicle includes a button or sensor near the liftgate designed configured to be tapped by the foot of the user. In such scenarios, the liftgate may be opened without an opportunity for the user to ascertain the status of objects in the cargo area. Often, as the vehicle is operated, the objects in the cargo area shift. For example, road characteristics (e.g., curves, road grade, etc.) and/or driving characteristics (e.g., acceleration and/or deceleration, etc.) may cause the objects in the cargo area shift. The objects may sift so they are banked against the liftgate. If the liftgate is opened when the object is banked against the liftgate, the object may tumble out of the cargo area onto the ground and sustain damage.

As used herein, a "liftgate" refers to a door or panel at a rear of a vehicle that opens upwardly to provide access to a cargo area, trunk or other compartment of the vehicle. In some examples, the liftgate includes a hatch that is coupled to a body of the vehicle (e.g., a sports-utility vehicle (SUV), a minivan, a hatchback. etc.) via a hinge located along an upper edge of a cargo area or compartment. In other examples, the liftgate includes a trunk lid that is coupled to a body of the vehicle (e.g., a sedan, a compact car, etc.) via a hinge along an outer edge of a trunk.

As describe below, the vehicle includes a liftgate that automatically opens and closes upon receiving a command from a user. The liftgate includes one or more sensors, such as cameras, infrared sensors, ultrasonic sensors, etc. The sensor(s) is/are mounted on an interior surface of the liftgate so, when closed, the field of view (FOV) of the sensor(s) is facing inwardly into the cargo area. Alternatively or additionally, in some examples, the sensor(s) is/are mounted on a side panel of the cargo area so that the FOV of the sensor(s) is facing to detect objects in the cargo area. Using the sensors, the vehicle determines whether objects are within the cargo area. When an object is detected, the vehicle monitors the object to determine whether the object is banked (e.g. leaning against, inclined upon, etc.) the interior of the liftgate such that when the liftgate is opened, the object will fall out of the cargo. In some example, the vehicle determines properties of the object that are indicative that the object will fall out of the cargo area. For example, objects with rounded surfaces may be likely to fall out of the cargo area. In some example, when an object is not banked against the interior of the liftgate, the vehicle predicts whether the object will fall out of the cargo area based on disturbances caused by the opening of the liftgate. In some such example, the vehicle bases the based on the vehicle's orientation (e.g., the pitch, roll, and/or yaw of the vehicle relative to its axes) as determined by an orientation sensor (e.g., an accelerometer, a gyroscope, etc.) and/or the properties of the object(s) in the cargo area. For example, when the vehicle is parked on an incline (such that the front of the vehicle is elevated compared to the back of the vehicle) and the object is a sphere, an ovoid, or an prolate spheroid, etc., such as a watermelon, the vehicle may determine that there is a probability that the object will shift when the liftgate opens such that the object will fall out of the cargo area.

When the vehicle determines that an object is backed against the liftgate or is likely to shift toward the liftgate when the liftgate is opened, the vehicle provides an audio and/or visual alert to the user in response to receiving an input to open the liftgate. In some examples, the alert is produced by the vehicle (e.g., via lights, via a horn and/or speakers, via a center console display, etc.). In some examples, the vehicle sends a message to the mobile device or key fob (e.g., via a wireless protocol such as a Bluetooth® protocol or a local area network protocol, etc.) that causes the mobile device or key fob to provide a warning. Additionally, the vehicle requests that the user confirm that she/he desires to open the liftgate by providing the input. Upon receipt of the confirmation, the vehicle opens the liftgate at a speed slower than its normal opening speed to an intermediate position. The intermediate position is between fully open and fully closed. The intermediate position is defined such that the gap between the liftgate and the cargo area does not allow objects banked against the liftgate door to fall out of the liftgate area. For example, the intermediate position may be a position of the liftgate such that the gap between the liftgate and the cargo area is 4.58 centimeters (2 inches). After opening the liftgate to the intermediate position, the vehicle requests that the user reconfirm (e.g., by providing an input) that the user desires to continue to open the liftgate. In response to receiving the input, the vehicle opens the liftgate. In some examples, the vehicle opens the liftgate at the slower speed.

Figure 1A:
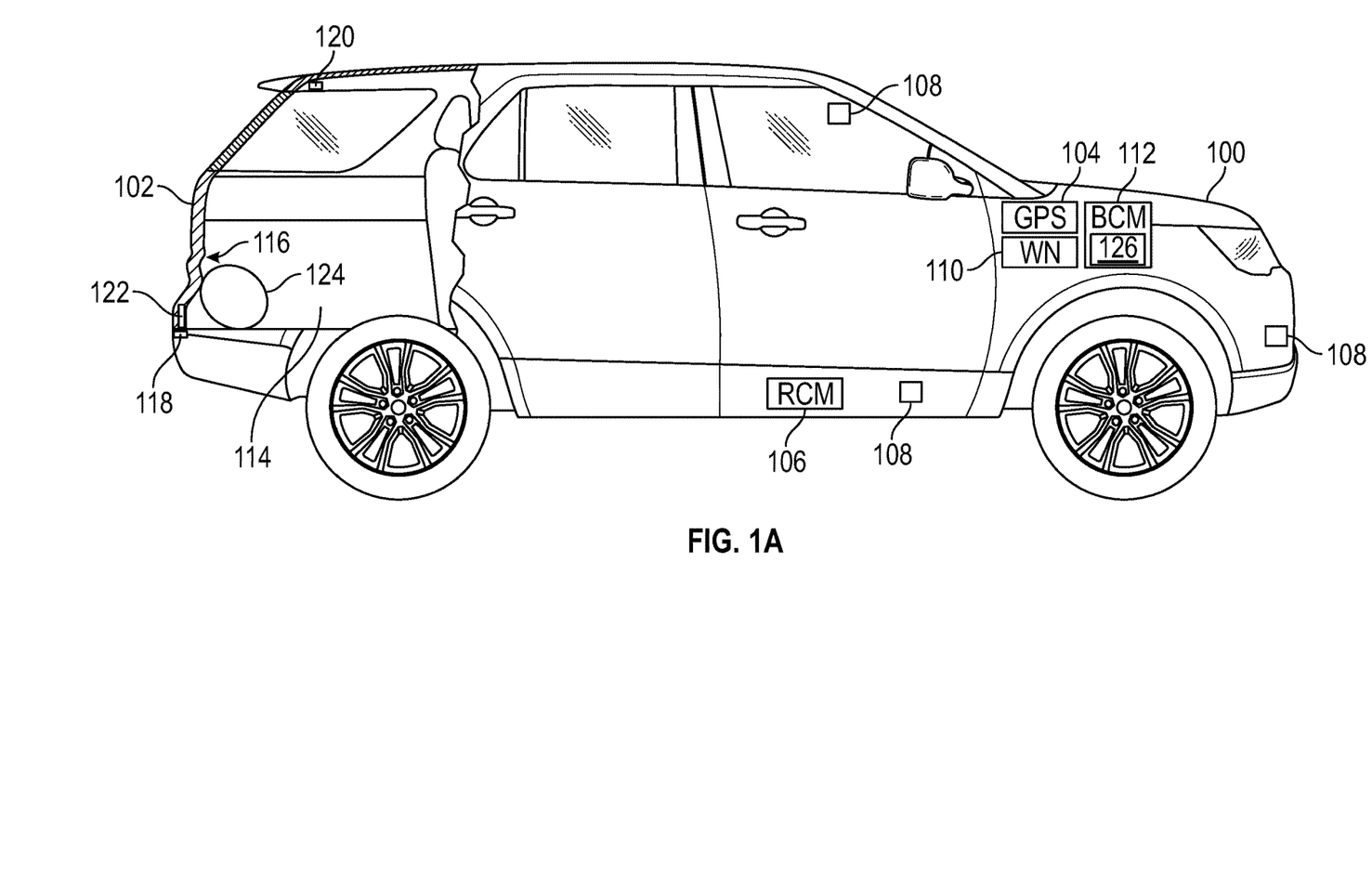
FIGS. 1A and 1B illustrate a vehicle operating in accordance with the teachings of this disclosure.
Figure 1B:
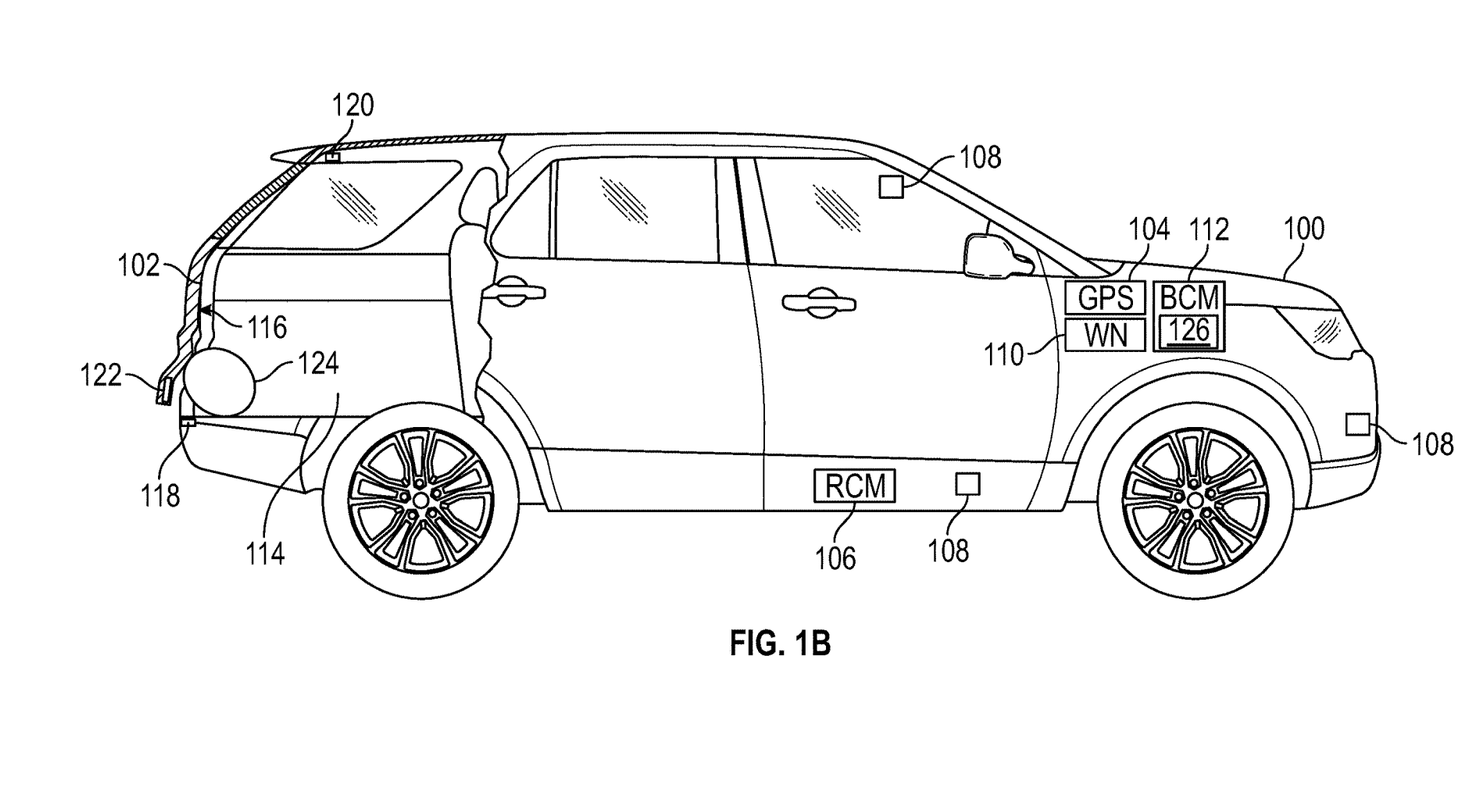

FIGS. 1A and 1B illustrate a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be a semi-autonomous vehicle (e.g., some routine motive functions, such as parking, are controlled by the vehicle 100), or an autonomous vehicle (e.g., motive functions are controlled by the vehicle 100 without direct driver input). In this illustrated example, the vehicle 100 includes a liftgate 102, a global positioning system (GPS) receiver 104, a restraint control module (RCM) 106, one or more vehicle sensors 108, a wireless node 110, and a body control module (BCM) 112.

The liftgate 102 is a door or panel hinged to the upper portion of an entrance to a cargo area 114 located at the rear end of the vehicle 100. In the illustrated examples, the liftgate 102 opens upwardly to provide access to the cargo area 114. An interior surface 116 of the liftgate 102 faces the interior of the vehicle 100 when the liftgate 102 is closed. The liftgate 102 includes a latch 118 and a motor 120. The latch 118 unlatches based on a signal received from, for example, the body control module 112. The motor 120 opens and closes the liftgate 102 based on signals received from, from example, the body control module 112. The motor 120 opens and closes the liftgate 102 at different speeds. In some examples, the motor 120 is configured to open the liftgate 102 at either a regular speed or a low speed. In such examples, the low speed is slower than the regular speed.

In the illustrated example, the liftgate 102 includes an internal sensor 122 mounted on the interior surface 116 of the liftgate. Alternatively, in some examples, the internal sensor 122 is mounted in a different location, such as a sidewall defining the cargo area 114, a ceiling of the interior of the vehicle 100 above the cargo area 114, and/or on the C-pillar of the vehicle 100. The internal sensor 122 has a sensing area (sometimes referred to as a "field of view") that encompasses the cargo area 114 when the liftgate 102 is closed. The internal sensor 122 may be any suitable sensor that can detect objects (e.g., the object 124) within the cargo area 114 and determine the location of the object 124 within the cargo area 114. In some examples, the internal sensors 122 is a camera, an infrared sensor, or an ultrasonic sensor, etc.

The restraint control module 106 control one or more safety systems of the vehicle 100, such as deployment of the air bag. The restraint control module 106 includes one or more inertial sensors that determine the orientation (e.g., the pitch, yaw, and/or roll) of the vehicle 100. For example, the restraint control module 106 may include an accelerometer and/or a gyroscope.

The vehicle sensors 108 may be arranged in and around the vehicle 100 in any suitable fashion. The vehicle sensors 108 may mounted to measure properties around the exterior of the vehicle 100. Additionally, some vehicle sensors 108 may be mounted inside the cabin of the vehicle 100 or in the body of the vehicle 100 (such as, the engine compartment, the wheel wells, etc.) to measure properties in the interior of the vehicle 100. For example, such vehicle sensors 108 may include accelerometers, odometers, tachometers, pitch and yaw sensors, wheel speed sensors, microphones, tire pressure sensors, and biometric sensors, etc. In the illustrated example, the vehicle 100 include vehicle sensors 108 include sensors to detect the presence of the user (e.g., radar, lidar, ultrasonic sensors, cameras, etc.).

The wireless node 110 communicatively couples with a mobile device to facilitate the vehicle 100 receiving commands from and/or sending alerts and prompts to the user operating the mobile device. The wireless node 110 includes hardware (e.g., processors, memory, storage, antenna, etc.) and software to control wireless network interfaces. In some examples, the wireless node 110 implements a standards-based protocol, such as Bluetooth®, Bluetooth® Low Energy, Z-Wave®, Zigbee®, and/or a wireless local area network (e.g., IEEE 802.11 a/b/g/n/ac, etc.).

The body control module 112 controls various subsystems of the vehicle 100. For example, the body control module 112 may control an immobilizer system, and/or power mirrors, etc. The body control module 112 is electrically coupled to circuits that, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated examples, the body control module 112 controls the latch 118 and the motor 120 of the liftgate 102. As described below, the body control module 112 unlatches the latch 118, opens the liftgate 102, and closes the liftgate 102 in response to input by the user. The input may be received from a mobile device, a key fob, or a hardware of software button on the center console, and/or a button or sensor near the liftgate designed configured to be tapped by the foot of the user, etc. In the illustrated examples, the body control module 112 includes a liftgate controller 126.

The liftgate controller 126 determines whether an object (e.g., the object 124) located within the cargo area 114 (a) is banked against the liftgate 102 or (b) is likely to fall out of the vehicle 100 when the liftgate 102 is opened. Generally, the liftgate controller 126 waits until the user or the mobile device of the user is in the vicinity of the vehicle 100. In some examples, the liftgate controller 126 uses the vehicle sensors 108 and/or the wireless node 110 to detect the user and/or the mobile device of the user. Using the internal sensor 122, the liftgate controller 126 determines whether objects 124 are within the cargo area 114. When an object 124 is detected, the liftgate controller 126 monitors the object 124 to determine whether the object 124 is banked (e.g. leaning against, inclined upon, etc.) against the interior surface 116 of the liftgate 102 such that when the liftgate 102 is opened, the object 124 will fall out of the cargo area 114. In some examples, the liftgate controller 126 determines that the object 124 is banked against the liftgate 102 when the object is in contact with the interior surface 116 of the liftgate 102. In some example, the liftgate controller 126 also determines whether the object 124 is banked against the liftgate 102 based on surface properties of the object 124. For example, if the object 124 has one or more rounded surfaces and is in contact with the interior surface 116 of the liftgate 102, the liftgate controller 126 may determine that the object 124 is banked against the liftgate 102 Alternatively, in some examples, the liftgate controller 126 determines that the object 124 is banked against the liftgate 102 when based on the object 124 being in the cargo area 114.

In some example, when the object 124 is not banked against the interior surface 116 of the liftgate 102, the liftgate controller 126 predicts whether the object 124 is likely to fall out of the cargo area 114 in response to disturbances caused by the opening of the liftgate 102. The liftgate controller 126 bases the prediction on one or more of (A) the orientation (e.g., the pitch, roll, and/or yaw of the vehicle relative to its axes) of the vehicle 100, (B) the surface properties of the object 124, and/or (C) movement of the object 124 while the vehicle 100 was in motion. For example, if the vehicle 100 is parked on an incline where the front of the vehicle 100 is higher than the rear of the vehicle 100 and the object 124 moved while the vehicle 100 was in motion, the liftgate controller 126 may predict that the object 124 will fall out of the vehicle 100 when the liftgate 102 is opened.

In some examples, to determine the orientation of the vehicle, the liftgate controller 126 uses measurements from one or more inertia sensors (e.g., the inertia sensor(s) of the restraint control module 106). Alternatively or additionally, in some examples, the liftgate controller 126 uses navigation data based on coordinates from the GPS receiver 104 to determine the orientation of the vehicle 100. For example, the navigation data may indicate that the vehicle 100 is currently located on a road that has an incline or decline.

In some examples, to determine the surface properties of the object 124, the liftgate controller 126 analyzes measurements from the internal sensor 122. In some such examples, the liftgate controller 126 may associate a likelihood of the object 124 falling out of the vehicle 100 with objects that have rounded surfaces (such as object that are spherical, ovoid, or prolate spheroids, etc.) and/or substantially rounded surfaces (such as surfaces with many tessellated regular polygons, etc.).

In some examples, the liftgate controller 126 monitors the cargo area 114 when the vehicle 100 is in motion. In some examples, the liftgate 102 includes a force sensor along the bottom portion of the interior surface 116 of the liftgate 102 that detects when the object 124 contacts the liftgate 102 as the object 124 moves within the cargo area 114. In some examples, the liftgate controller 126 analyzes inertia sensor data to detect vibrations attributable to the object 124 moving in the cargo area 114. In some examples, the liftgate 102 include a microphone or an accelerometer mounted on the glass of the liftgate 102 to detect sounds that are attributable to the object 124 moving in the cargo area 114. Examples of accelerometers mounted on glass of the vehicle 100 to detect sounds are described in application Ser. No. 15/802,254, entitled "Accelerometer-Based External Sound Monitoring for Backup Assistance in a Vehicle," filed Nov. 11, 2017, which is hereby incorporated by reference in its entirety.

When the liftgate controller 126 determines that the object 124 is banked against the liftgate 102 or is likely to shift toward the liftgate 102 when the liftgate 102 is opened, the liftgate controller 126 provides an audio and/or visual alert to the user in response to receiving an input (e.g., via a mobile device, via a key fob, via a button, via a foot sensor, etc.) to open the liftgate 102. In some examples, the liftgate controller 126 produces the alert is using the vehicle 100 (e.g., via lights, via a horn and/or speakers, via a notification on the center console display, etc.). In some examples, the liftgate controller 126 sends a message to the mobile device or key fob via the wireless node 110. In such examples, the message causes the mobile device or key fob to provide the warning (e.g., display a notification, generate a sound, vibrate, etc.).

Additionally, the liftgate controller 126 requests that the user confirm that she/he desires to open the liftgate 102 by providing an additional input. Upon receipt of the confirmation, the liftgate controller 126 opens the liftgate 102 at a speed slower than its normal opening speed to an intermediate position. The intermediate position is a position of the liftgate 102 that is between fully open and fully closed. The intermediate position is defined such that the gap between the liftgate 102 and the cargo area 114 does not allow objects banked against the liftgate door to fall out of the liftgate area. FIG. 1A illustrates the liftgate 102 in the fully closed position. FIG. 1B illustrates the liftgate in an example intermediate position. For example, the intermediate position may be a position of the liftgate such that the gap between the liftgate and the cargo area is 4.58 centimeters (2 inches). After opening the liftgate to the intermediate position, the liftgate controller 126 requests that the user reconfirm (e.g., by providing the input) that the user desires to continue to open the liftgate 102. In response to receiving the input, the liftgate controller 126 resumes opening the liftgate. In some examples, the liftgate controller 126 opens the liftgate at the slower speed.

Figure 2:
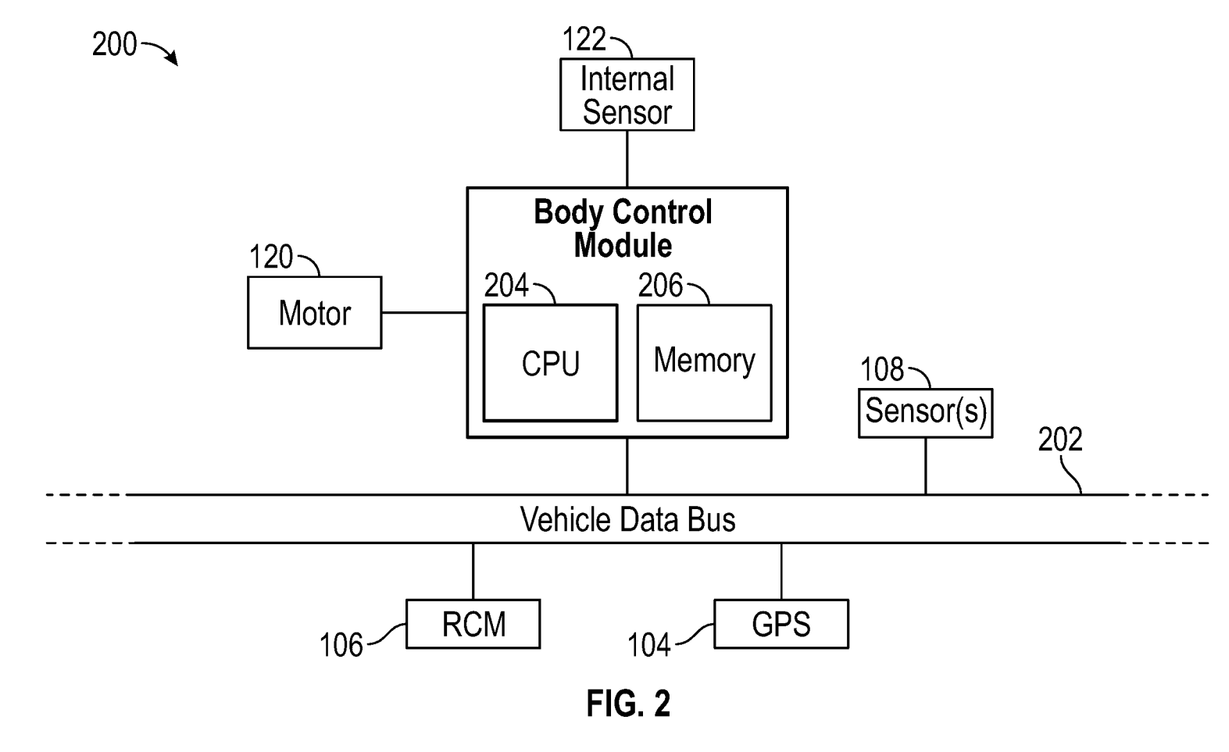
FIG. 2 is a block diagram of electronic components of the vehicle of FIG. 1.

FIG. 2 is a block diagram of electronic components 200 of the vehicle 100 of FIG. 1. In the illustrated example, the electronic components 200 includes the GPS receiver 104, the restraint control module 106, the vehicle sensors 108, the wireless node 110, the body control module 112, the liftgate motor 120, the internal sensor 122, and the vehicle data bus 202.

The body control module 112 includes a processor or controller 204 and memory 206. In the illustrated example, the body control module 112 is structured to include liftgate controller 126. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the [parts connected to the vehicle data bus]. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
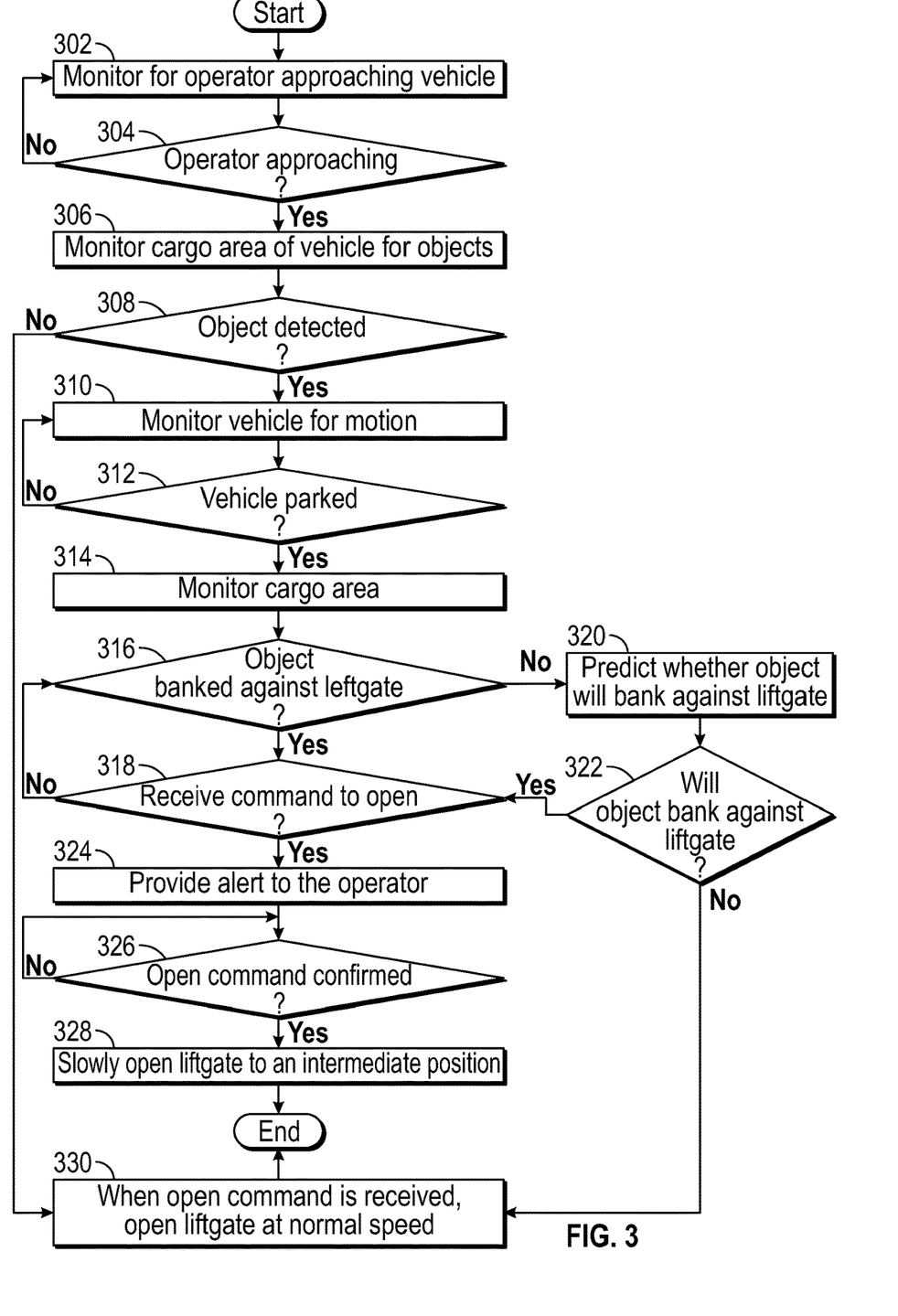
FIG. 3 is a flowchart of a method to manage movement of the liftgate in response to shifting cargo, which may be implemented by the electronic components of FIG. 2.

FIG. 3 is a flowchart of a method to manage movement of the liftgate 102 in response to shifting cargo, which may be implemented by the electronic components 200 of FIG. 2. Initially, at block 302, the liftgate controller 126 monitors the area around the vehicle 100 for the user. For example, the liftgate controller 126 may detect the user using the vehicle sensors 108 and/or detect the mobile device of the user using the wireless node 110. At block 304, the liftgate controller 126 determines whether the user is detected. When the user is detected, the method continues at block 306. When the user is not detected, the method returns to block 302.

At block 306, the liftgate controller 126 monitors the cargo area 114 for objects (e.g., the object 124). At block 308, the liftgate controller 126 determines whether an object is detected. When an object is detected, the method continues at block 310. Otherwise, when the an object is not detected, the method continues at block 330. At block 310, the liftgate controller 126 monitors the vehicle 100 to determine whether the vehicle 100 is moving. At block 312, the liftgate controller 126 monitors the cargo area 114 for movement of the object. At block 314, the liftgate controller 126 determines whether the vehicle 100 is parked. When the vehicle is parked, the method continues to block 314. When the vehicle 100 is not parked, the method returns to block 310.

At block 314, the liftgate controller 126 determines whether the object is banked against the liftgate. 102. When the object is banked against the liftgate 102, the method continues at block 316. When the object is not banked against the liftgate, the method continues at block 320. At block 316, the liftgate controller 126 determines whether an input has been received to open the liftgate 102, when a command has been received, the method continues to block 324. When the command has not been received, the method returns to block 314.

At block 320, the liftgate controller 126 predicts whether the object is likely to bank against the liftgate 102 or otherwise fall out of the vehicle 100 when the liftgate 102 is opened. At block 322, the liftgate controller 126 determines whether the object is likely to fall out of the vehicle 100. When the object is likely to fall out of the vehicle 100, the method continues to block 316. When the object is not likely to fall out of the vehicle 100, the method continues at block 330.

At block 324, the liftgate controller 126 provides an alert to the user. At block 326, the liftgate controller 126 waits to receive an input confirming that the user desires to open the liftgate 102. At block 328, the liftgate controller 126 slowly autonomously opens the liftgate to an intermediate position at a speed that is slower than the normal liftgate opening speed.

At block 330, the liftgate controller 126 opens the liftgate 102 at the normal liftgate opening speed in response to receiving an input to open the liftgate.

The flowchart of FIG. 3 is representative of machine readable instructions stored in memory (such as the memory 206 of FIG. 2) that comprise one or more programs that, when executed by a processor (such as the processor 204 of FIG. 2), cause the vehicle 100 to implement the example liftgate controller 126 of FIGS. 1 and 2. Further, although the example program(s) is/are described with reference to the flowchart illustrated in FIG. 3, many other methods of implementing the example liftgate controller 126 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a liftgate with a sensor on an inner surface, the liftgate providing access to a cargo area of the vehicle; and
   a processor configured to:
      determine, during a period in which the liftgate is in a closed position, that an object is banked against the liftgate using measurements from the sensor;
      determine that a command to open the liftgate is received; and
      open, based on the determination that the command to open the liftgate is received and the determination that the object is banked against the liftgate, the liftgate to an intermediate position between fully open and fully closed, wherein a distance between the liftgate in the intermediate position and the cargo area is based on a size of the object.

2. The vehicle of claim 1, wherein the processor is further configured to produce an alert before autonomously opening the liftgate to the intermediate position.

3. The vehicle of claim 1, wherein the processor is further configured to prompt a user to repeat an input to confirm the command to open the liftgate before autonomously opening the liftgate to the intermediate position.

4. The vehicle of claim 1 wherein the processor is further configured to open the liftgate at a first speed when opening the liftgate to the intermediate position, wherein the first speed is slower than a speed at which the liftgate would open if the object were not determined to be banked against the liftgate.

5. The vehicle of claim 4, wherein the processor is further configured to:
   determine that the object is not banked against the liftgate; and
   open, based on the determination that the object is not banked against the liftgate and also based on the command to open the liftgate, the liftgate at a second speed, the second speed being faster than the first speed.

6. The vehicle of claim 1, wherein the processor is further configured to:
   determine that the object is likely to fall out of the vehicle when the liftgate is open.

7. The vehicle of claim 6, wherein the processor is further configured to:
   open, based on the determination that the object is likely to fall out of the vehicle when the liftgate is open, the liftgate to the intermediate position when the command to open the liftgate is received.

8. The vehicle of claim 6, wherein the determination that the object is likely to fall out of the vehicle is based on a determination that the vehicle is parked on an incline such that a front of the vehicle is elevated compared to a back of the vehicle.

9. The vehicle of claim 6, wherein the determination that the object is likely to fall out of the vehicle is based on a determination that the object has a rounded surface shape.

10. The vehicle of claim 6, wherein the determination that the object is likely to fall out of the vehicle is based on a determination that the object is moving within the cargo area when the vehicle is in motion.

11. The vehicle of claim 1, wherein the distance between the liftgate in the intermediate position and the cargo area is small enough to prevent the object from falling from the cargo area.

12. The vehicle of claim 1, wherein determining that an object is banked against the liftgate is based on a determination, using a force sensor in the liftgate, that the object is applying a force to the liftgate.

13. A method comprising:
   determining, with a liftgate sensor and during a period in which the liftgate is in a closed position, that an object is in a cargo area of a vehicle;
   determining, with a vehicle processor, that the object is likely to fall out of the vehicle from the cargo area;
   receiving a command to open a liftgate of the vehicle; and
   opening, based on receiving the command to open the liftgate and the determination that the object is likely to fall out of the vehicle, the liftgate to an intermediate position between fully open and fully closed, wherein a distance between the liftgate in the intermediate position and the cargo area is based on a size of the object.

14. The method of claim 13, wherein determining that the object is likely to fall out of the vehicle includes determining that the vehicle is parked on an incline such that a front of the vehicle is elevated compared to a back of the vehicle.

15. The method of claim 13, wherein determining that the object is likely to fall out of the vehicle includes determining that the object has a rounded surface shape.

16. The method of claim 13, wherein determining that the object is likely to fall out of the vehicle includes determining that the object is moving within the cargo space when the vehicle is in motion.

17. The method of claim 16, wherein determining movement of the object when the vehicle is in motion includes determining that the object contacts the liftgate when the vehicle is in motion.

18. The method of claim 13, further including: providing, before autonomously opening the liftgate to the intermediate position, an alert to a user; and
   prompting the user to repeat an input to confirm the command to open the liftgate.

19. The method of claim 13 wherein opening the liftgate to the intermediate position further includes opening the liftgate at a first speed, wherein the first speed is slower than a speed at which the liftgate would open if the object were not determined to be banked against the liftgate.

20. The method of claim 19, further including opening, based on the determination that the object is not likely to fall out of the vehicle and based on receiving the command to open the liftgate, the liftgate at a second speed, the second speed being faster than the first speed.

* * * * *